United States Patent [19]

Hertler

[11] Patent Number: 4,806,605
[45] Date of Patent: Feb. 21, 1989

[54] MONOMERS AND INITIATORS FOR GROUP TRANSFER POLYMERIZATION

[75] Inventor: Walter R. Hertler, Kennett Square, Pa.

[73] Assignee: E. I. Du Pont de Nemours and Company, Wilmington, Del.

[21] Appl. No.: 7,758

[22] Filed: Jan. 27, 1987

[51] Int. Cl.$^4$ ............................................. C08F 4/44
[52] U.S. Cl. ............................ 526/190; 526/194; 526/279; 528/9; 528/10; 525/330.6; 525/342
[58] Field of Search ............... 526/170, 279; 528/91, 528/10; 525/330.6, 342

[56] References Cited

U.S. PATENT DOCUMENTS

| | | | |
|---|---|---|---|
| 4,414,372 | 11/1983 | Farnham et al. | 526/190 |
| 4,417,034 | 11/1983 | Webster | 526/190 |
| 4,508,880 | 4/1985 | Webster | 526/190 |
| 4,524,196 | 6/1985 | Farnham et al. | 526/190 |
| 4,581,428 | 4/1986 | Farnham et al. | 526/190 |
| 4,588,795 | 5/1986 | Dicker et al. | 526/192 |
| 4,598,161 | 7/1986 | Farnham et al. | 564/101 |
| 4,605,716 | 8/1986 | Hertler | 526/190 |
| 4,622,372 | 11/1986 | Dicker et al. | 526/190 |

OTHER PUBLICATIONS

J. Amer. Chem. Socl, 105, 5706 (1983), Webster, et al.

Primary Examiner—Joseph L. Schofer
Assistant Examiner—Peter F. Kulkosky

[57] ABSTRACT

A Group Transfer Polymerization process comprising contacting under polymerizing conditions at least one acrylic monomer with (i) a tetracoordinate organosilicon, organotin or organogermanium polymerization initiator having at least one initiating site and (ii) a cocatalyst which is a source of fluoride, bifluoride, cyanide or azide ions or a suitable Lewis acid, Lewis base or selected (bi)-oxyanion, said process further characterized in that the monomer comprises a selected polyenoate and/or the initiator comprises a selected polyenolate, to produce an internally and/or terminally unsaturated "living" polymer.

23 Claims, No Drawings

MONOMERS AND INITIATORS FOR GROUP TRANSFER POLYMERIZATION

BACKGROUND OF THE INVENTION

1. Field of the Invention

This invention relates to Group Transfer Polymerization, to selected polyenoate compounds which are useful as monomers therein, and to selected polyenolate compounds which are useful as initiators therein.

2. Background

U.S. Pat. Nos. 4,414,372,; 4,417,304; 4,508,880; 4,524,196; 4,581,428; 4,588,795; 4,598,161; 4,605,716; 4,622,372; 4,656,233; 4,681,918; and 4,711,942; and commonly assigned U.S. patent application Ser. No. 004,831 filed Jan. 13, 1987 as a continuation-in-part of application Ser. No. 872,610 filed June 10, 1986 and expressly abandoned, referred to hereinafter as "the aforesaid patents and patent applications", disclose processes for polymerizing an acrylic or maleimide monomer to a "living" polymer in the presence of:

(i) an initiator having at least one initiating site and which is a tetracoordinate organo(Si, Sn or Ge) compound, including such compound having at least one oxygen, nitrogen or sulfur atom attached to the Si, Sn or Ge; and (ii) a co-catalyst which is a source of fluoride, bifluoride, cyanide or azide ions or a suitable Lewis acid, Lewis base or selected oxyanion. Such polymerization processes have become known in the art as Group Transfer Polymerization (Webster et al., "Group Transfer Polymerization—a New and Versatile Kind of Addition Polymerization", J. Am. Chem. Soc. 105, 5706 (1983)).

Preferred monomers for use in Group Transfer Polymerization, hereinafter referred to as "Group Transfer Polymerization acrylic monomer(s)", are selected from acrylic and maleimide monomers of the formula $CH_2=C(Y)X$ and

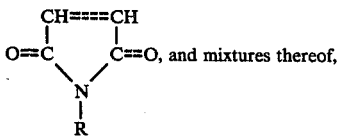

and mixtures thereof, wherein:

X is $-CN$, $-CH=CHC(O)X'$ or $-C(O)X'$;

Y is $-H$, $-CH_3$, $-CH$ or $-CO_2R$, provided, however, when X is $-CH=CHC(O)X'$, Y is $-H$ or $-CH_3$;

X' is $-OSi(R^1)_3$, $-R$, $-OR$ or $-NR'R''$;

each $R^1$, independently, is a hydrocarbyl radical which is an aliphatic, alicyclic, aromatic or mixed aliphatic-aromatic radical containing up to 20 carbon atoms or $-H$, provided that at least one $R^1$ group is not $-H$;

R is:
(a) a hydrocarbyl radical which is an aliphatic, alicyclic, aromatic or mixed aliphatic-aromatic radical containing up to 20 carbon atoms;
(b) a polymeric radical containing at least 20 carbon atoms;
(c) a radical of (a) or (b) containing one or more ether oxygen atoms within aliphatic segments thereof;
(d) a radical of (a), (b) or (c) containing one or more functional substituents that are unreactive under polymerizing conditions; or
(e) a radical of (a), (b), (c) or (d) containing one or more reactive substituents of the formula $-Z'-(O)C-C(Y^1)=CH_2$ wherein $Y^1$ is $-H$ or $-CH_3$ and $Z'$ is O or NR' wherein $R^{40}$ is as defined below; and each of R' and R" is independently selected from $C_{1-4}$ alkyl.

Preferred initiators are selected from tetracoordinate organsilicon, organotin and organogermanium compounds which may be represented by the formulas $Q_3'MZ$, $Q_2'M(Z^1)_2$ and $[Z^1(Q')_2M]_2O$ wherein:

each Q', independently, is selected from $-R^1$, $-OR^1$, $-SR^1$ and $-N(R^1)_2$;

Z is an activating substituent selected from the group consisting of $-CN$,

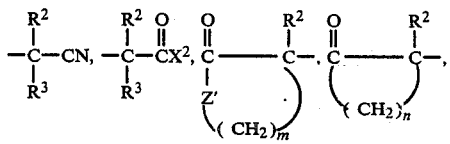

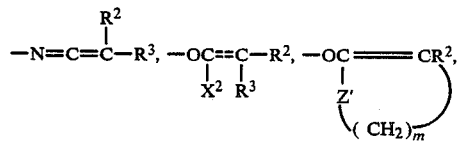

$-OC=\!=\!=\!=\!=CR^2$, $(CH_2)_n$ $-SR^6$, $-OP(NR'R'')_2$, $-OP(OR^1)_2$, $-OP[OSi(R^1)_3]_2$ and mixtures thereof;

$X^2$ is $-OSi(R^1)_3$, $-R^6$, $-OR^6$ or $-NR'R''$;

$R^6$ is
(a) a hydrocarbyl radical which is an aliphatic, alicyclic, aromatic or mixed aliphatic-aromatic radical containing up to 20 carbon atoms;
(b) a polymeric radical containing at least 20 carbon atoms;
(c) a radical of (a) or (b) containing one or more ether oxygen atoms within aliphatic segments thereof;
(d) a radical of (a), (b) or (c) containing one or more functional substituents that are unreactive under polymerizing conditions; or
(e) a radical of (a), (b), (c) or (d) containing one or more initiating sites;

each of $R^2$ and $R^3$ is independently selected from $-H$ and a hydrocarbyl or polymeric radical, defined as for $R^6$ above, subparagraphs (a) to (e);

R', R", $R^1$ and Z' are as defined above for the monomer;

m is 2, 3 or 4;

n is 3, 4 or 5;

$Z^1$ is

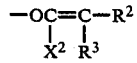

wherein $R^2$ and $R^3$ are as defined above;
$R^2$ and $R^3$ taken together are

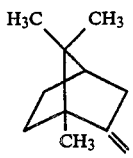

provided
Z is

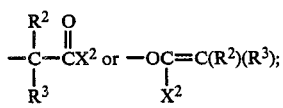

$X^2$ and either $R^2$ or $R^3$ taken together are

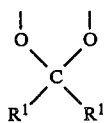

provided
Z is

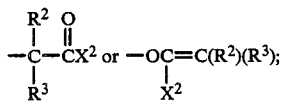

and
M is Si, Sn, or Ge.

Preferred initiators are those wherein M is Si.

Preferred co-catalysts are selected from a source of bifluoride ions $HF_2^-$; a source of fluoride, cyanide or azide ions; a source of oxyanions, said oxyanions being capable of forming a conjugate acid having a pKa (DMSO) of about 5 to about 24; a suitable Lewis acid, for example, zinc chloride, bromide or iodide, boron trifluoride, an alkylaluminum oxide or an alkylaluminum chloride; or a suitable Lewis base, for example, a Lewis base of the formula selected from $(R^4)_3M'$ and

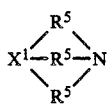

wherein:

M' is P or As;

$X^1$ is —Ṅ— or —ĊH, provided, however, when the monomer is a nitrile, $X^1$ is —ĊH each $R^4$, independently, is:
(a) a $C_{1-12}$ alkyl, $C_{4-12}$ cycloalkyl, $C_{6-12}$ aralkyl or di($C_{1-4}$ alkyl)amino group;
(b) a group of (a) wherein two or three of the alkyl, cycloalkyl and/or aralkyl groups are joined together by means of one or more carbon-carbon bonds;
(c) a group of (a) or (b) wherein the alkyl, cycloalkyl and/or aralkyl groups contain within aliphatic segments thereof one or more hetero atoms selected from O, N and S; or
(d) a group of (a), (b) or (c) wherein the alkyl, cycloalkyl and/or aralkyl groups contain one or more substituents that are unreactive under polymerizing conditions; and each $R^5$ is $-CH_2CH_2-$ or $-CH_2CH_2-$ containing one or more alkyl or other substituents that are unreactive under polymerizing conditions.

Additional details regarding Group Transfer Polymerization can be obtained from the aforesaid patents and patent applications, the disclosures of which are hereby incorporated by reference.

Numerous polyenoates containing two or more conjugated double bonds are disclosed in the art. Silyl enolates containing up to three conjugated double bonds are also known, and polyunsaturated silyl enolate initiators for "living" polymerization are generically disclosed in the aforesaid patents and patent applications. Polymers of conjugated polyenoates prepared by conventional polymerization methods are also known in the art, and the preparation of "living" polymers from polyenoate monomers by silicon-initiated polymerization is disclosed in the aforesaid patents and patent applications, the polyenoate monomers being of the formula $CH_2=C(Y)CH=CHC(O)X'$ wherein Y is H, $CH_3$, CN or $CO_2R$ and X' includes OR wherein R is defined as above.

It is an object of the present invention to provide processes for preparing internally and/or terminally unsaturated "living" polymers by polymerizing one or more selected polyenoate monomers in the presence of a tetracoordinate organosilicon, organogermanium or organotin initiator and suitable co-catalyst. A further object of the invention is to provide polyenoate initiators and polyenoate monomers which are useful in Group Transfer Polymerization. Another object of this invention is to provide "living" polymers, solutions, coatings and shaped articles prepared therefrom, processes for quenching the "living" polymers, and solution or dispersion coatings and adhesives and shaped articles prepared from the quenched polymers. These and other objects will become apparent from the following description of the invention.

DETAILED DESCRIPTION OF THE INVENTION

The invention herein resides in the process of preparing a "living" polymer having internal and/or terminal unsaturation by contacting under polymerizing conditions at least one acrylic monomer with (i) a tetracoordinate organosilicon, organotin or organogermanium polymerization initiator containing at least one initiating site, and (ii) a co-catalyst which is a source of bifluoride, fluoride, cyanide or azide ions, or a suitable (bi)oxyanion, Lewis acid or Lewis base, the process further characterized in that:

(i) the monomer comprises one or more polyenoate compounds of the formula $CH(R^2)=C(R^3)+C(R^4)=C(R^5)]_n-C(O)X$; or (ii) the initiator comprises one or more polyenolates of the formula $Q^2+C(R^3)=C(R^4)\}_nQ^1$ or C-silylated isomers thereof; or (iii) the monomer comprises one or more polyenoate compounds of the formula $CH(R^2)=C(R^3)+C(R^4)=C(R^5)]_n-C(O)X$ and the initiator comprises one or more polyenolates of the formula $Q^2\!\!-\!\!\{C(R^3)\!\!=\!\!C(R^4)\}_n Q^1$ or C-silylated isomers thereof wherein:

$R^2$ is:
(a) —H or —C(O)X;
(b) a hydrocarbyl radical which is an aliphatic, alicyclic, aromatic or mixed aliphatic-aromatic radical containing up to 20 carbon atoms;
(c) a polymeric hydrocarbyl radical containing at least 20 carbon atoms;
(d) a radical of (b) or (c) containing one or more ether oxygen atoms within aliphatic segments thereof; or
(e) a radical of (b), (c) or (d) containing one or more functional substituents that are inert under polymerizing conditions;

each of $R^3$, $R^4$ and $R^5$, independently, is —H or a radical as defined in (b), (c), (d) and (e) for $R^2$; or $R^2$ and the closest $R^4$, or $R^3$ and the closest $R^5$, or the two closest $R^4$ groups, or the two closest $R^5$ groups, taken together, form a ring structure containing at least 5 carbon atoms or at least 5 carbon atoms and a heteroatom selected from —O—, —N— and —S—, the heteroatom —N— being substituted with R' defined as below;

X is —OR or —NR'R";

R is a radical as defined in (b), (c), (d) and (e) for $R^2$; or R and the closest $R^5$, taken together, form a 5- to 8-membered lactone ring;

each of R' and R", independently, is $C_{1-4}$ alkyl; and n is an integer and is at least 1; provided, however:
(i) when n is 1, at least one of $R^2$, $R^4$ and $R^5$ is hydrocarbyl;
(ii) the number of $R^{2-5}$ hydrocarbyl substituents does not exceed the number of —C≡C— double bonds;
(iii) a carbon atom substituted with $R^{2-5}$ hydrocarbyl is not adjacent to more than one other carbon atom substituted with $R^{2-5}$ hydrocarbyl, hydrocarbyl in (i), (ii) and (iii) being as defined above in (b), (d) and (e) for $R^2$;

$Q^1$ is —C($R^5$)=C(OM[$R^1$]$_3$)X';
$Q^2$ is —C($R^2$)=C(X')OM[$R^1$]$_3$ or —$R^2$;
X' is —OSi($R^1$)$_3$, —R, —OR or —NR'R";
each $R^1$, independently, is a hydrocarbyl radical which is an aliphatic, alicyclic, aromatic, or mixed aliphatic-aromatic radical containing up to 20 carbon atoms; and
M is Si, Sn or Ge;

provided, however, in the initiator of the formula $Q^2\!\!-\!\!\{C(R^3)\!\!=\!\!C(R^4)\}_n Q^1$ or C-silylated isomers thereof not more than one of $R^5$ and the closest $R^4$ is hydrocarbyl; and when $Q^2$ is —C($R^2$)=C(X')OM[$R^1$]$_3$, not more than one of $R^2$ and the adjacent $R^3$ is hydrocarbyl.

Preferably, $R^2$ or $R^5$, more preferably $R^5$, is hydrocarbyl. Preferably, hydrocarbyl in R and $R^{2-5}$ is methyl or ethyl, more preferably methyl; X' is —OR; and n is 1-3.

The "living" polymer prepared by the invention process comprises:

A.
(i) at least three repeat units of the formula —CH(R$^2$)—$\{C(R^3)\!\!=\!\!C(R^4)\}_n C(R^5)(C(O)X)$—; or
(ii) at least three repeat units of a Group Transfer Polymerization acrylic monomer; or
(iii) a mixture of at least three repeat units of (i) and (ii);

each of (i), (ii) and (iii) containing (a) —M($R^1$)$_3$ moieties (from the initiator) at "living" ends of the polymer chains; and
(b) the initiator residue, that is, after removal of —M($R^1$)$_3$ from the initiator, at non-living ends of the polymer chains, said residue comprising a saturated hydrocarbyl radical or the unsaturated moiety $R^2$—C($R^3$)=C($R^4$)—$_n$C($R^5$)(C(O)X')—, provided, however, the initiator residue is the unsaturated moiety when the "living" polymer contains only repeat units (ii); and B.
when $Q^2$ in the polyenolate initiator is other than $R^2$, central segments of the formula

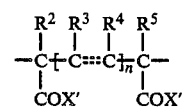

wherein:
hydrocarbyl radical is as defined in (b)-(e) in $R^2$ above;
X' is —OSi($R^1$)$_3$, —R, —OR or —NR'R"; and
M, R, $R^{1-5}$, R', R", X and n are defined as above;

It will be understood from the description herein that the process of the present invention may employ polyenoate or Group Transfer Polymerization acrylic monomers, the latter being as defined hereinabove, and/or polyenolate or Group Transfer Polymerization initiators, that is, a tetracoordinate organosilicon, organotin or organogermanium polymerization initiator containing at least one initiating site, provided that, if only a Group Transfer Polymerization acrylic monomer is used, the initiator must include the polyenolate compound defined above and, if only a Group Transfer Polymerization initiator is used, the monomer must include the polyenoate compound defined above.

The invention also resides in solutions of the "living" polymer, in coatings and shaped articles prepared therefrom, in a process of quenching the "living" polymer with an active hydrogen source, and in solution and dispersion coatings and adhesives and in shaped articles prepared from the quenched polymer.

The polyenoate monomers and polyenolate initiators employed in the present invention are believed to be known or obvious compounds.

Catalysts, solvents, concentrations of reactants and catalysts, process conditions and optional additives, such as polymer life enhancement agents and/or chain transfer agents, employed in the present process are those described in the aforesaid patents and patent applications, the disclosures of which have been incorporated herein by reference. Preferred catalysts are sources of bifluoride ions or oxyanions.

When employing both the polyenolate initiator and the polyenoate monomer of the invention, it is preferred to employ a polyenoate initiator whose structure most closely matches that of the polyenoate monomer.

The polyenolate initiators of the aforesaid formula are either available commercially or are prepared from the monomers of the invention, or related polyenoates, by known methods, such as those described by (i) I. Fleming et al., Tetra. Lett., 34, 3205 (1979), or (ii) N. R. Long et al., Syn. Comm., 11, 678 (1981), by reaction with a hydrogen-donating compound of the formula ($R^1$)$_3$M—H, or by reacting the lithium enolate with a suitable organosilicon, organogermanium or organotin compound such as those of the formula $(R^1)_3M$—Cl, wherein $R^1$ and M are as defined above.

It will be understood that the initiators of the aforesaid formula are mono- or difunctional depending on $Q^2$, and that the latter are useful for preparing polymers wherein both ends are "living", from which coupled or block polymers can be prepared. It is further contemplated that such initiators may contain additional initiating sites at the ends of hydrocarbyl substituents, and/or functional groups which can be used to prepare branched, star, block or cross-linked polymers.

The polyenoate monomers employed in the process of this invention are mono- or diesters or derivatives thereof, such as amides or lactones, having at least two conjugated double bonds. The monomers may contain hydrocarbyl substituents and, optionally attached thereto, functional groups which, although inert during "living" polymerization, can be used to post-react the virgin polymer to provide branched, block, graft, ladder or cross-linked polymeric products. Moreover, such features will be supplemented by functions provided by the initiator, residua of which are chemically bound to the polymer of the invention, as described in the aforesaid patents and patent applications.

The polymers of the present invention are "living", that is, they contain terminal $(R^1)_3M$— initiating moieties (at the "living" ends of the polymer chains), and can be capped, or further polymerized in the presence of catalyst by the addition of more of the same or a different active monomer. The virgin polymers can be further converted into branched, block, graft, ladder and/or cross-linked structures depending on the distribution of "living" (initiating) sites and functional groups as described above. Moreover, the polymers are internally and/or terminally unsaturated (if, respectively, the monomer is a polyenoate and/or if the initiator is a polyenolate), said unsaturation being useful for cross-linking and/or otherwise chemically modifying the polymer.

Coatings and films can be cast from solutions of the "living" polymers of the invention. Alternatively and preferably, the "living" polymers can be quenched by treatment with an active hydrogen source as described in the aforesaid patents and patent applications. The quenched polymers are useful for preparing shaped articles and solution or dispersion formulations which are useful for coating or adhesively bonding a wide variety of substrates, including metals, cellulosics (wood and paper), glass and plastics.

Polymers prepared in the present invention differ morphologically from those prepared by known prior art methods. For example, poly(ethyl sorbate) obtained in the present process is a viscous fluid having a glass transition temperature ($T_g$) of 11.7° C. in contrast to the known stereoregular crystalline poly(ethyl sorbate) having a melting point ($T_m$) of 175° C. and prepared by anionic polymerization (G. Natta, M. Farina, P. Corradini, M. Peraldo, M. Donati, and P. Ganis, Chimica Ind., Milano, 1960, 42, 1361). Because many of the dienoate polymers prepared by the present process have $T_g$s below ambient temperatures, they are especially useful as adhesives. Acrylic polymers prepared with a diene-or triene-initiator of the invention have terminal vinyl or butadienyl groups and are useful for grafting, via free radical polymerization, to give block or comb polymers. Example 16 D herein demonstrates the copolymerization of butyl methacrylate with the butadiene-ended poly(methyl methacrylate) macromonomer prepared by initiation of methyl methacrylate with a hexatriene-initiator. Example 17 herein demonstrates the initiation of methyl 2-methylpentadienoate polymerization with the difunctional initiator

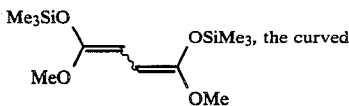, the curved line indicative of the fact that various stereoisomers are present.

Homopolymerization of diethyl muconate by the present process is quantitative (Example 21 herein), in sharp contrast to prior art processes, e.g. Y. Bando et al., *J. Polymer Sci., Polymer Chem. Ed.*, 15, 1917 (1977), in which radical and anionic (n-butyl lithium initiator) polymerization gave low conversion of diethyl muconate to 1,4-trans polymer.

In the following examples which provide preferred embodiments of the invention process, number and weight average molecular weights of the polymer products ($\overline{M}_n$, $\overline{M}_w$) were determined by gel permeation chromatography (GPC). The polydispersity (D) of the polymer is defined by $D = \overline{M}_w/\overline{M}_n$. Unless otherwise specified, the "living" polymer products were quenched by exposure to moist air or methanol prior to molecular weight determination. Parts and percentages are by weight and temperatures are in degrees Celsius unless otherwise specified.

EXAMPLE 1

Polymerization of Ethyl Sorbate

To a solution of 0.1 mL (0.5 mmol) of [(1-methoxy-2-methyl-1-propenyl)oxy]trimethylsilane (MTS), and 10 µL of 0.1M tetrabutylammonium m-chlorobenzoate/THF in 20 mL of the THF was added 7 g (7.3 mL, 50 mmol) of ethyl sorbate which had been purified by passage over a column of neutral alumina under argon. No exotherm was observed, so 50 µL of additional catalyst solution was added, leading to a slow rise in temperature of 10° during 30 minutes. One hour after the end of the exotherm, a sample was removed for analysis. NMR showed that conversion to poly(ethyl sorbate) was 100%. GPC showed $\overline{M}_n$ 18,700, $\overline{M}_w$ 36,300, D=1.97; $\overline{M}_n$ theoretical 14,100 measured against a PMMA standard. Addition of 3.7 mL of ethyl sorbate gave a slow 2° exotherm. NMR showed that 35% of the second monomer charge was converted to polymer, $\overline{M}_n$ 29,800 (theory for 35% conversion of second charge 16,550), $\overline{M}_w$ 58,800, D=1.97. The polymer was isolated by twice precipitating into hexane to give 4 g of rubbery poly(ethyl sorbate). Vapor phase osmometry (VPO) MW in toluene 24,500.

IR: 975 cm$^{-1}$ (trans CH=CH). [η] 0.3759 (chloroform, 25°). Differential scanning colorimetry (DSC): $T_g$ 11.7°. NMR: 0.90 ppm (m, 3H, backbone CH$_3$), 1.2 (m, 3H, CH$_3$ of ethyl), 2.3–3.3 (m, 2H, CH), 4.05 (m, 2H, OCH$_2$), 5.35 (broad s. 2H, HC=CH).

EXAMPLE 2

Preparation of Block Copolymer of Methyl Methacrylate (MMA) and Ethyl Sorbate

To a solution of 90 µL (0.43 mmol) of MTS and 10 µL of 0.1M tetrabutylammonium m-chlorobenzoate/tetrahydrofuran (THF) in 10 mL of THF was added 3.2 mL (30 mmol) of MMA. After adding 10 µL of additional catalyst solution, the temperature rose to 44°. A sample was removed for GPC analysis which showed $\overline{M}_n$ 6420 (theor. 7000), $\overline{M}_w$ 8230, D=1.28. Then 7.3 mL (50 mmol) of ethyl sorbate was added, and following addition of an additional 20 μL of catalyst solution, the temperature slowly rose to 46°. GPC analysis of a sample showed $\overline{M}_n$ 17,600 (theor. 23,300), $\overline{M}_w$ 29,400, D=1.68. The addition of 3.2 mL of MMA along with 30 μL of additional catalyst solution gave only a slight exotherm. Precipitation twice into hexane gave 9.5 g of tacky polymer, $\overline{M}_n$ 19,600, $\overline{M}_w$ 33,400, D=1.71, $\eta_{inh}$ 0.299 (chloroform, 25°). DSC showed a $T_g$ at 9°, and on reheat at 17.7°. NMR showed that the polymer consisted of 52 mole % ethyl sorbate units and 48 mole % MMA units.

EXAMPLE 3

Polymerization of Ethyl 2-Methylpentadienoate (EMPD)

To a solution of 40 μL (0.2 mmol) of MTS and 5 μL of 0.1M tetrabutylammonium m-chlorobenzoate/THF was added 4 g (4.35 mL, 28.5 mmol) of distilled ethyl 2-methylpentadienoate. No exotherm occurred, so 40 μL of additional catalyst solution of 20 μL of additional MTS were added with no exotherm. Addition of 10 μL of catalyst solution gave a yellow color but no exotherm. Upon addition of 50 μL of MTS (0.25 mmol) the temperature rapidly rose to 52° and the solution became viscous. NMR showed that the conversion to polyEMPD was 100%. The solution was quenched with 1 mL of methanol, and the gummy polymer was precipitated with hexane. The polymer was dissolved in methylene chloride, washed with brine, dried (magnesium sulfate), and evaporated to 3.5 g of rubbery polyEMPD. GPC: $\overline{M}_n$ 52,600 (theor. 16,000), $\overline{M}_w$ 228,000, D=4.33. DSC: $T_g$ −23.6°. NMR: 1.17 (s, 3H, α CH$_3$), 1.24 (t, J=7 Hz, 3H, CH$_3$ of Et), 2.18 (m, J=14 Hz, 1H, chain CH$_2$), 2.46 (m, J=7 Hz, 1H, chain CH$_2$), 4.10 (q, J=7 Hz, 2H, CH$_2$ of Et), 5.02 (d, J=16 Hz, 1H, trans C=CH), 5.36 (d, t, J=16 Hz, J=7 Hz, 1H, C=CH). IR (film from chloroform): 1730 cm$^{-1}$ (saturated ester C=O), 975 cm$^{-1}$ (trans HC=CH). [η] 0.9605 (chloroform, 25°). UV: End absorption only.

EXAMPLE 4

Preparation of Block Copolymer of Methyl Methacrylate and Ethyl 2-Methylpentadienoate To a solution of 60 μL (0.3 mmol) of MTS, and 70 μL of 0.04M tetrabutylammonium biacetate/THF was added 2.2 mL (20 mmol) of MMA. After the end of the exotherm, analysis of a sample of the solution showed 100% conversion of PMMA of $\overline{M}_n$ 6660 (theor. 6760), $\overline{M}_w$ 7430, D=1.12. Then, 6 g (6.5 mL, 42.75 mmol) of ethyl 2-methylpentadienoate, which had been stored over molecular sieves, was added dropwise. The exotherm reached 41°, but the temperature fell during the addition of the final 2 mL of EMPD feed. Anaylsis of the solution showed some residual EMPD. The polymer had $\overline{M}_n$ 24,200 (theor. 26,760), $\overline{M}_w$ 51,200, D=2.12. The GPC curve was bimodal, indicating about 10% of the polymer was about 9000 MW (probably unreacted PMMA homopolymer). The polymer was isolated and washed as in Example 3 to give 5.3 g of elastomeric polymer. NMR analysis of the polymer showed it to consist of 60 mole % EMPD units and 40 mole % MMA units.

EXAMPLE 5

A.

(E,E,E)-3(2,4-Hexadien-1-ylidene)-4,5-dihydro-3(3H)-furanone ("OTL")

In a reaction flask fitted with a mechanical stirrer was placed 5.05 g of 60% sodium hydride dispersion in mineral oil (0.126 mol). The sodium hydride was then washed three times with toluene, removing the toluene with a filter stick. Then, 330 mL of toluene was added, followed by 28 g (0.126 mol) of α-diethylphosphono-γ-butyrolactone, prepared by the method of K. H. Buchel, H. Rochling, F. Korte, *J. Liebig's Ann. Chem.*, 1951, 10, 685. When the addition was complete, the mixture was stirred at 50°-60° until hydrogen evolution had ceased (about 30 min.). After cooling to 20°, 12.12 g (13.9 mL, 0.126 mol) of sorbaldehyde was added. After stirring at 80° for 2 hours, the mixture was filtered hot, and the filtrate was evaporated under reduced pressure. The residual oil (18 g) gradually crystallized. Recrystallization from carbon tetrachloride-heptane gave 5.4 g of pale yellow crystals, m.p. 94°-98°, of OTL. Recrystallization from toluene-heptane gave 2.5 g of OTL, m.p. 94°-99°. UV (chloroform): 315 nm (ξ 39,100). IR (chloroform): 1745 cm$^{-1}$ (conj. 5-membered lactone), 1650, 1625 cm$^{-1}$ (conj. C=C). NMR (chloroform-d, 360 mHz): 1.84 (d, J=6 Hz, 3H, CH$_3$-8), 2.98 (t of d, J=7 Hz, J$_{allylic}$=3 Hz, 2H, CH$_2$-2), 4.40 (t, J=7 Hz, 2H, OCH$_2$-1), 5.99 (d of q, J$_{trans}$=15 Hz, J$_{Me}$=6 Hz, 1H, vinyl H-7), 6.1–6.3 (m, 2H, vinyl H-5 and -6), 6.57 (d of d, J$_{H5}$=15 Hz, J$_{H3}$=12 Hz, 1H, vinyl H-4), 7.1 (d of t, J$_{H4}$=12 Hz, J$_{allylic}$=3 Hz, 1H, vinyl H-3).

A sample of OTL of greater purity was obtained by sublimation at 85°-90°/0.1 mm. This gave colorless crystals with m.p. 99.5°-100.5°.

Anal. calcd. for C$_{10}$H$_{12}$O$_2$: C, 73.15; H, 7.37. Found: C, 71.31; H, 7.21.

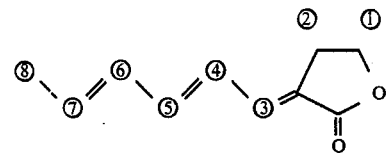

B. Polymerization of OTL with MTS and Tetrabutylammonium Acetate

To a solution of 0.82 g (5 mmol) of OTL and 1.0 mL of MTS in 10 mL of THF was added 20 μL of 0.1M tetrabutylammonium acetate/THF. No exotherm was observed, so an additional 120 μL of catalyst solution was added, leading to an amber color formation and a slow 2° exotherm. A precipitate formed. NMR analysis of the reaction mixture showed no residual monomer. The mixture was filtered and the filter cake was washed with THF to give 0.48 g of colorless solid polymer, poly(OTL). Evaporation of the filtrate and suspension of the residue in hexane and filtration gave 0.58 g of brown polymer. The NMR spectra of the two polymer samples were nearly identical, the polymers differing only in molecular weight. GPC analysis of the THF-"insoluble" poly(OTL) (from which part of the sample had to be removed by filtration in order to make up the 0.25% solution in THF for GPC) showed $\overline{M}_n$ 7240, $\overline{M}_w$ 10,900, D=1.51. The soluble poly(OTL) fraction had $\overline{M}_n$ 1850, $\overline{M}_w$ 9350, D=5, with about 2% $\overline{M}_n$ 2,551,000, $\overline{M}_w$ 8,706,000, D=3.41. The "insoluble" poly(OTL) was readily soluble in methylene chloride, chloroform, and 1,2-dichloroethane, but insoluble in THF and toluene. The polymer tenaciously retained THF, which could be removed only after 2 days at 50°–70°/0.1 mm. The polymer also retained the trimethylsilyl group as evidenced by the NMR spectrum, permitting calculation of a $\overline{M}_n$ of 10,000. NMR (chloroform-d, 360 mHz): 0.14 (s, 3H, SiMe), 1.05 (m, 3H, Me), 2.0–2.4 (m, 2H, C-methylene), 2.55–2.75 (m, 1H, CH), 4.14–4.24 (m, m, 2H, O—CH$_2$), 5.5–5.7 (m, 2H, C=CH), 6.0–6.22 (m, 2H, C=CH). UV (chloroform: 251 nm (ξ17,800) consistent with conjugated diene, probably cisoid. DSC: First heat shows exotherm peaking at 143.9°. Reheat shows no exotherm at 143.9°, but instead, a well-defined T$_g$ at 150.2°. TGA shows onset of rapid weight loss at 370.2°.

EXAMPLE 6

Preparation of Block Copolymer of Methyl Methacrylate and Ethyl Sorbate

To a solution of 0.4 mL (2 mmol) of MTS and 52 μL (0.4 mmol) of bis(dimethylamino)methyl phosphine in 10 mL of propylene carbonate was added 5.4 mL (50 mmol) of methyl methacrylate. After a delay, the exothermic polymerization caused the temperature to rise to 56°. A sample was removed for analysis by GPC: $\overline{M}_n$ 3150 (theor. 2600), $\overline{M}_w$ 4320, D=1.37. Then, 14.6 mL (100 mmol) of ethyl sorbate was added, followed by 10 mL of propylene carbonate and 104 μL (0.8 mmol) of bis(dimethylamino)methyl phosphine. A slow exotherm of 1.5° was observed. After 3 h a sample removed for analysis showed some residual ethyl sorbate monomer, and polymer with bimodal molecular weight: 96% $\overline{M}_n$ 5470 (theor. 9600) $\overline{M}_w$ 7640, D=1.40, and 4% $\overline{M}_n$ 191,000, $\overline{M}_w$ 353,000, D=1.85. Then, 5.4 mL (50 mmol) of methyl methacrylate was added producing a slight exotherm. After 18 h analysis of a sample showed residual methyl methacrylate and polymer with 96% $\overline{M}_n$ 6470 (theor. 12,100), $\overline{M}_w$ 9650, D=1.49; 4% $\overline{M}_n$ 190,000, $\overline{M}_w$ 305,000, D=1.60. Little of the second methyl methacrylate block was formed. The gummy polymer was precipitated into 1:1 methanol-water, redissolved in tetrahydrofuran and again precipitated with 1:1 water-methanol. The polymer was then dissolved in methylene chloride and washed with aqueous sodium chloride solution, dried (magnesium sulfate) and evaporated to 4.7 g of flexible polymer. NMR showed the composition of the block copolymer to be 54 mole % methyl methacrylate units and 46 mole % ethyl sorbate units, $\overline{M}_n$ 8940, $\overline{M}_w$ 23,200, D=2.59.

EXAMPLE 7

Polymerization of Methyl 2-Methylpentadienoate with 1-Ethoxy-1-trimethylsiloxy-1,3-butadiene (Batch Process)

To a solution of 6.6 mL (50 mmol) of methyl 2-methylpentadienoate (prepared by the method of H. O. House, G. H. Rasmusson, *J. Org. Chem.* 1961, 26, 4278, and purified over a short column of neutral alumina under an argon atmosphere) and 10 μL of 0.1M tris(dimethylamino)sulfonium bifluoride (TAS bifluoride)/acetonitrile in 50 mL of tetrahydrofuran was added 55 μL (0.25 mmol) of 1-ethoxy-1-trimethylsiloxy-1,3-butadiene (prepared by the method of I. Fleming, J. Goldhill, I. Paterson, *Tet. Lett.*, 1979, 34, 3205). When the exothermic polymerization was finished, a sample was removed for analysis: NMR showed no residual monomer; GPC of the polymer showed $\overline{M}_n$ 46,500, $\overline{M}_w$ 58,700, D=1.26. Vapor phase osmometry (VPO) in toluene showed $\overline{M}_n$ 35,000 (theor. $\overline{M}_n$ 25,200). After quenching with 1 mL of methanol, the polymer was precipitated with hexane, dissolved in methylene chloride, washed with brine, dried (magnesium sulfate) and evaporated to 5.2 g of tacky polymer. DSC showed a T$_g$ of 2.7° (first heat), 2.8° (on second heat), and −0.6° (on third heating). Thermogravimetric analysis (TGA) showed onset of weight loss at 325° (in nitrogen) and at 315° (in air). NMR of the polymer (360 MHz, chloroform-d) clearly shows a 1,4-polymerization and a trans C=C double bond in the polymer backbone. The observed trans vinyl H coupling constant is 16 Hz, and the C-methyl resonance occurs at 1.17 ppm.

EXAMPLE 8

Poly(methyl 2-methylpentadienoate) as an Adhesive for Glass

A sample of poly(methyl 2-methylpentadienoate) from Example 7 was softened with methylene chloride and pressed between two glass plates. After warming at 90° and then cooling, the glass plates remained firmly bonded together by the clear adhesive.

EXAMPLE 9

Polymerization of Methyl 2-Methylpentadienoate with 1-Ethoxy-1-trimethylsiloxy-1,3-butadiene, (Feed Process)

To a solution of 0.22 mL (1 mmol) of 1-ethoxy-1-trimethylsiloxy-1,3-butadiene and 50 μL of 0.1M tetrabutylammonium m-chlorobenzoate/THF in 30 mL of tetrahydrofuran was added 4 mL (30 mmol) of methyl 2-methylpentadienoate at a rate to keep the temperature below 35°. Sixty minutes after the end of the exotherm, a sample was removed for analysis: NMR showed no residual monomer, and GPC showed that the polymer had $\overline{M}_n$ 8440 (theor. 3900), $\overline{M}_w$ 9950, D=1.18. Then, an additional 4 mL (30 mmol) of methyl 2-methylpentadienoate was fed below 35°. After 18 h a sample was removed for analysis: NMR showed no residual monomer, and GPC showed that the polymer had $\overline{M}_n$ 11,800 (theor. 7686), $\overline{M}_w$ 16,000, D=1.35. The polymer was isolated by quenching with 1 mL of methanol and evaporating to 7.4 g of viscous polymer. Because complete polymerization of monomer occurred after the polymer was allowed to stand for 1 h, and there was a corresponding increase in molecular weight, it can be concluded that the polymer must have been "living".

EXAMPLE 10

Polymerization of Methyl 2-Methylpentadienoate (Feed Process)

The procedure of Example 9 was followed except that 0.2 mL (1 mmol) of MTS was used in place of 1-ethoxy-1-trimethylsiloxy-1,3-butadiene. NMR showed that there was no residual monomer after both the first and second monomer feeds. GPC after the first feed showed $\overline{M}_n$ 28,300 (theor. 3900), $\overline{M}_w$ 53,100, D=1.88, and after the second feed $\overline{M}_n$ 33,900 (theor. 7670), $\overline{M}_w$ 61,400, D=1.81.

EXAMPLE 11

Preparation of Block Copolymer of Methyl 2-Methylpentadienoate and Methyl Methacrylate To a solution of 0.11 mL (0.5 mmol) of 1-ethoxy-1-trimethylsiloxy-1,3-butadiene and 10 μL of 0.1M TAS bifluoride/acetonitrile in 30 mL of THF was added 6.6 mL (50 mmol) of methyl 2-methylpentadienoate at a rate to keep the temperature below 35°. When the exotherm was over, a sample was removed for analysis. NMR showed no residual monomer, and GPC showed $\overline{M}_n$ 32,000 (theor. 12,700), $\overline{M}_w$ 46,000, D=1.44. Then, 5.4 mL (50 mmol) of methyl methacrylate was added. The polymer was precipitated with hexane, dissolved in methylene chloride, washed with brine, dried (magnesium sulfate) and evaporated to 7.7 g of tacky polymer. GPC shows $\overline{M}_n$ 27,800 (theor. 22,700), $\overline{M}_w$ 49,600, D=1.78. Proton NMR showed the polymer to consist of 20.6 mole % methyl methacrylate units and 79.4 mole % methyl 2-methylpentadienoate units.

EXAMPLE 12

Preparation of Block Copolymer of Methyl Methacrylate and Methyl 2-Methylpentadienoate The procedure of Example 11 was followed except that the order of monomer addition was reversed, and 0.1 mL (0.5 mmol) of MTS was used in place of 1-ethoxy-1-trimethylsiloxy-1,3-butadiene. After the addition of the methyl methacrylate, NMR showed no residual monomer, and GPC showed $\overline{M}_n$ 10,500 (theor. 10,100), $\overline{M}_w$ 15,300, D=1.46. There was obtained 10.7 g of block copolymer with $\overline{M}_n$ 30,900, $\overline{M}_w$ 108,000, D=3.49. A shoulder in the GPC trace indicated that about 20% of the total polymer consisted of unreacted poly(methyl methacrylate) (PMMA) of $\overline{M}_n$ 10,500, with the remainder of the polymer being block copolymer. NMR analysis showed the composition of the product to be 47 mole % methyl methacrylate units, and 53 mole % methyl 2-methylpentadienoate units.

EXAMPLE 13

Polymerization of Methyl Methacrylate with 1-Ethoxy-1-trimethylsiloxy-1,3-butadiene To a solution of 0.19 g (0.22 mL, 1 mmol) of 1-ethoxy-1-trimethylsiloxy-1,3-butadiene and 10 μL of 1M TAS bifluoride/acetonitrile in 30 mL of THF was added 10.8 mL (100 mmol) of mehtylmethacrylate at a rate to keep the temperature from rising above 35°. A sample removed for analysis showed 93% conversion to poly(methyl methacrylate) with $\overline{M}_n$ 18,600 (theory for 93% conversion, 9400), $\overline{M}_w$ 25,600, D=1.38. After quenching with 1 mL of methanol, the polymer was precipitated with 1:1 methanol-water to give, after drying, 9 g of poly(methyl methacrylate) with a terminal vinyl group.

EXAMPLE 14

Identification of the Vinyl End Group in Poly(methyl methacrylate) Initiated With 1-Ethoxy-1-trimethylsiloxy-1,3-butadiene To a solution of 0.44 mL (2 mmol) of 1-ethoxy-1-trimethylsiloxy-1,3-butadiene and 100 μL of 0.1M tetrabutylammonium m-chlorobenzoate/THF in 10 mL of THF was added 1.08 mL (10 mmol) of methyl methacrylate. After the exothermic oligomerization was over, a sample was removed for analysis. NMR showed that there was no residual monomer. After quenching with 0.5 mL of methanol, evaporation gave 0.95 g of poly(methyl methacrylate) as a tacky oligomer. Analysis by proton NMR (360 MHz, chloroform-d) showed: 5.5-5.7 ppm (m, 1H, C=CH), 4.95-5.1 ppm (m, 2H, C=CH₂), 2.85-3.1 ppm (m, 1H, C=CCHCOOR), 4.055 ppm (q, J=7 Hz, 2H, OCH₂), consistent with a terminal vinyl group. There was no resonance characteristic of olefin conjugated to an ester group which would have resulted from initiation at the gamma position of the initiator.

EXAMPLE 15

A. Preparation of 1-Ethoxy-1-trimethylsiloxy-1,3,5-hexatriene

To a solution of 21.2 mL (15.28 g, 0.151 mol) of diisopropylamine in 150 mL of THF at 0° was added 0.151 mole of 1.6M n-butyl lithium/hexane. After 30 minutes at 0°, the solution was cooled to −78°, and 20.6 g (0.147 mol) of ethyl hexa-3,5-dienoate was added below −70°. Then 16.8 g (19.7 mL, 0.155 mol) of chlorotrimethylsilane was added. After warming to room temperature, the solution was evaporated under reduced pressure, and the residue was treated with anhydrous hexane and filtered under argon. The filtrate was evaporated under reduced pressure, and the residue was distilled in a small Vigreux column to give 24.9 g of 1-ethoxy-1-trimethylsiloxy-1,3,5-hexatriene, b.p. 53.6°/0.2 mm to 57.2°/0.1 mm. The fraction (10.2 g) with b.p. 57.1°/0.1 mm was used for analysis. NMR (360 mHz, chlorform-d) shows 95% Z and 5% E stereochemistry at the substituted double bond: 0.26 (s, 9H, SiCH₃) [E isomer at 0.28 ppm]; 1.31 (t, $J_C$=7.5 Hz, 3H, CH₃) [E isomer 1.265 ppm]; 3.825 (q, $J_B$=7.5 Hz, 2H, OCH₂) [E isomer at 3.94 ppm]; 4.46 (d, $J_E$=10 Hz, 1HD) [E isomer at 4.54 ppm]; 4.825 (dd, $J_G$=10 Hz, $J_H$=2 Hz, 1HI); 4.96 (dd, $J_G$=17 Hz, $J_I$=2 Hz, 1HH); 5.95 (dd, $J_E$=15 Hz, $J_G$=10 Hz, 1HF); 6.375 (ddd, $J_H$=17 Hz, $J_I$=10 Hz, $J_F$=10 Hz, 1HG); 6.415 (dd, $J_F$=15 Hz, $J_D$=10 Hz, 1HE).

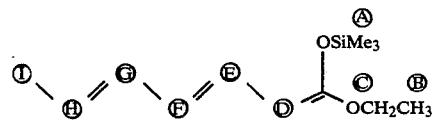

B. Polymerization of Methyl Methacrylate

To a solution of 0.21 g (0.24 mL, 1 mmol) of 1-ethoxy-1-trimethylsiloxy-1,3,5-hexatriene prepared in Part A and 50 μL of 0.1M tetrabutylammonium m-chlorobenzoate/THF in 15 mL of THF was added 5.4 mL (50 mmol) of methyl methacrylate at a rate such that the temperature did not rise above 35°. When the exothermic reaction was complete, a sample was removed for analysis. NMR showed that there was no residual monomer. GPC showed $\overline{M}_n$ 5910 (theor. 5125), $\overline{M}_w$ 6630, D=1.12. After quenching with 1 mL of methanol, precipitation with 1:1 methanol-water gave 4.9 g of poly(methyl methacrylate) with a terminal butadiene group.

C. Identification of Diene End Group of Poly(methyl methacrylate)

The procedure of Example 14 was followed except that 0.42 g (0.48 mL, 2 mmol) of 1-ethoxy-1-trimethylsiloxy-1,3,5-hexatriene prepared in Part A was used instead of 1-ethoxy-1-trimethylsiloxy-1,3-butadiene. Evaporation gave 1.0 of oligomeric poly(methyl methacrylate). The protron NMR spectrum of the product (360 mHz, chloroform-d) shows the presence of 5 vinyl protons: 5.0–5.1 ppm (m, 1H, C=CH$_2$), 5.11–5.2 ppm (m, 1H, C=CH$_2$), 5.42–5.65 ppm (m, 1H), 5.98–6.30 ppm (m, 2H). There is no indication of resonance characteristic of vinyl groups conjugated to an ester. Thus, substitution has occurred at the α-position of the triene rather than the ε-position, and there is a terminal diene group on the poly(methyl methacrylate).

D. Free-Radical Copolymerization of Butadiene-terminated Poly(methyl methacrylate) and Butyl Methacrylate A mixture of 1.0 g of PMMA with a terminal butadiene group prepared in Example 16 ($\overline{M}_n$ 5910, $\overline{M}_w$ 6630, D=1.12), 2 g of freshly distilled butyl methacrylate (BMA), and 2 mg of azobis(isobutyronitrile) in 10 mL of toluene was heated at reflux while a solution of 10 mg of azobis(isobutyronitrile) in 3 mL of toluene was added dropwise during 30 minutes. A sample removed for analysis showed residual butyl methacrylate (NMR). GPC showed $\overline{M}_n$ 3140, $\overline{M}_w$ 9910, D=3.16. The solution was concentrated, and polymer was isolated by precipitation with hexane to give 1.3 g of solid polymer. NMR analysis showed a 2:1 molar ratio of MMA:BMA units. Two additional precipitations from methylene chloride with hexane (to remove any butyl methacrylate homopolymer) gave 0.93 g of block copolymer with the same 2:1 molar ratio of PMMA:PBMA, $\overline{M}_n$ 8850, $\overline{M}_w$ 13,900, D=1.57. This $\overline{M}_n$ and molar ratio requires that a single PMMA chain (degree of polymerization: 60) was copolymerized with 30 butyl methacrylate units. This would give a theoretical $\overline{M}_n$ of 10,089 in reasonable agreement with the observed value of 8850.

EXAMPLE 16

Polymerization of Methyl 2-Methylpentadienoate with 1,4-Bis(trimethylsiloxy)-1,4-bis(methoxy)-1,3-butadiene To a solution of 75 μL of 0.1M tetrabutylammonium m-chlorobenzoate/THF and 0.31 mL (0.29 g, 1 mmol) of (54.5% ZZ, 27.3% EE, 18.2% EZ)-1,4-bis(trimethylsiloxy)-1,4-bis(methoxy)-1,3-butadiene (prepared by the general procedure described by N. R. Long, M. W. Rathke, *Synthetic Commun.*, 1981, 11, 687) in 30 mL of THF was added 6.6 mL (50 mmol) of methyl 2-methylpentadienoate at a rate to keep the temperature from rising above 35°. After the exothermic reaction was over, a sample was removed for analysis. NMR showed no residual monomer. GPC showed $\overline{M}_n$ 25,700 (theor. 6400), $\overline{M}_w$ 41,200, D=1.60. After addition of 1 mL of methanol, precipitation with hexane gave 7 g of soft poly(methyl 2-methylpentadienoate).

EXAMPLE 17

Polymerization of Ethyl Acrylate with 1,4-Dimethyl-1,4-bis(trimethylsiloxy)-1,3-butadiene To a solution of 0.62 mL (2 mmol) of 1,4-dimethyl-1,4-bis(trimethylsiloxy)-1,3-butadiene and 10.8 mL (100 mmol) of ethyl acrylate in 50 mL of THF was added 20 μL of 1M tris(dimethylamino)sulfonium bifluoride/acetonitrile. A rapid, exothermic polymerization occurred causing the temperature to rise from 24° to 46.7°. A sample was removed for analysis. NMR showed that 69% of the ethyl acrylate was converted to polymer. GPC showed $\overline{M}_n$ 3160 (theory for 69% conversion 3550) $\overline{M}_w$ 5300, D=1.67. After addition of 1 mL of methanol, the solution was evaporated to 7.5 g of viscous poly(ethyl acrylate).

EXAMPLE 18

Polymerization of Methyl Methacrylate with 1,4-Dimethyl-1,4-bis(trimethylsiloxy)-1,3-butadiene The procedure of Example 17 was followed using 10.8 mL (100 mmol) of methyl methacrylate instead of ethyl acrylate. In order to obtain an exotherm of only 1°, 80 μL of 1M tris(dimethylamino)sulfonium bifluoride/acetonitrile was added. After 18 h precipitation with 1:1 methanol-water gave a gummy precipitate, which was dissolved in methylene chloride, dried (magnesium sulfate) and evaporated to 1.6 g of PMMA with $\overline{M}_n$ 1510 (theory for 16% conversion 900), $\overline{M}_w$ 3770, D=2.50.

EXAMPLE 19

Polymerization of Diethyl Muconate with 1-Ethoxy-1-trimethylsiloxy-1,3-butadiene To a solution of 2.0 g (10.1 mmol) of diethyl muconate (recrystallized from heptane, m.p. 62.5°) and 0.22 mL (1 mmol) of 1-ethoxy-1-trimethylsiloxy-1,3-butadiene in 10 mL of THF was added 100 μL of 0.1M tetrabutylammonium m-chlorobenzoate/THF. Rapid exothermic polymerization caused a 10° temperature rise to 38.6° with formation of a deep orange color. A sample was removed for analysis. NMR showed that conversion to polymer was quantitative. GPC showed $\overline{M}_n$ 1850 (theor. 2100), $\overline{M}_w$ 3330, D=1.80. After addition of 1 mL of methanol, evaporation gave 2.2 g of viscous poly(diethyl muconate). Proton NMR analysis of the polymer shows that it has a 1,4-structure. DSC showed a T$_g$ of −15.8°, IR (chloroform): 970 cm$^{-1}$ (trans —CH= CH—)

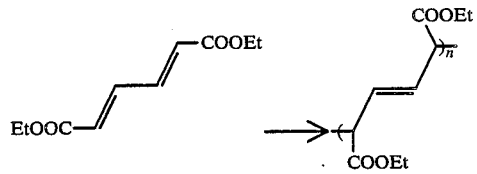

EXAMPLE 20

Polymerization of Diethyl Muconate with 1-Ethoxy-1-trimethyl-siloxy-1,3-butadiene To a solution of 7 g (35.31 mmol) of diethyl muconate and 50 μL of 0.1M tetrabutylammonium m-chlorobenzoate/THF in 30 mL of THF were added 60 μL (0.25 mmol) portions of 1-ethoxy-1-trimethylsiloxy-1,3-butadiene until a slow exotherm indicated that polymerization had begun. A total of 300 μL (1.25 mmol) of initiator was required. An additional 50 μL of 0.1M tetrabutylammonium m-chlorobenzoate/THF was added to obtain a slight increase in polymerization rate. After stirring for 18 h, a sample was removed for analysis. NMR showed that conversion to polymer was quantitative. GPC showed $\overline{M}_n$ 14,000, $\overline{M}_w$ 33,500, D=2.39. After addition of 1 mL of methanol, the solution was evaporated to a gummy polymer. The product was dissolved in methylene chloride and precipitated in hexane twice. The polymer was then dissolved in methylene chloride, washed with water, dried (magnesium sulfate), evaporated, and dried at 60°/0.1 mm to give 4.8 g of poly(diethylmuconate), with $\overline{M}_n$ 16,900, $\overline{M}_w$ 35,700, D=2.11. DSC shows a $T_g$ of 15.3°. TGA shows the onset of rapid weight loss at 270° in both air and nitrogen.

EXAMPLE 21

The following example illustrates preparation of (E) methyl 2-methyl-4-trimethylsilyl-2-butenoate (a C-silyl isomer of 1-methoxy-1-trimethylsiloxy-2-methyl-1,3-butadiene) and initiation of MMA polymerization therewith.

A. Preparation of (E) Methyl 2-methyl-4-trimethylsilyl-2-butenoate

To a solution of 94.6 mL (0.675 mol) of diisopropylamine in 750 mL tetrahydrofuran at 0° was added 0.673 mol of n-butyl lithium in hexane (approximately 1.6M), keeping the temperature at 0°. After 30 min, the solution was cooled to −78°, and 117 mL of hexamethylphosphoramide was added. Then 75 g (0.657 mol) of methyl tiglate containing 11% methyl 2-methyl-3-butenoate was added, keeping the temperature below −70°. After 30 min at −78°, 87.7 mL (0.69 mol) of chlorotrimethylsilane was added, and the solution was allowed to warm to room temperature. The solution was evaporated under reduced pressure, and the residue was treated with anhydrous hexane and filtered under argon. The filtrate was evaporated under reduced pressure, and the residue was distilled in a spinning band column to give 50.2 g of the title product, b.p. 49°/0.55 mm-49°/0.35 mm.

NMR (360 mHz, chloroform-d): 0.01 (s, 9H, CSiMe), 1.66 (d, J=10 Hz, 2H, SiCH$_2$), 1.74 (d, J=1.8 Hz, 3H, C=CME), 3.68 (s, 3H, OMe), 6.9 (tq, J=10 Hz, J=1.8 Hz, 1H, C=CH). I.R.: 1710 cm$^{-1}$ (conjugated ester), 1640 cm$^{-1}$ (conjugated C=C). U.V. (methylene chloride): 235 nm ($\epsilon$ 15,000).

B. Polymerization of MMA

To a solution of 0.19 g (0.21 mL, 1 mmol) of the initiator prepared in part A and 5.4 mL (50 mmol) of MMA (purified by passage over alumina under argon) in 50 mL of anhydrous tetrahydrofuran was added 10 μL of 1M TAS bifluoride/acetonitrile. The temperature of the reaction mixture rapidly rose from 25° to 50°. Then the reaction was quenched with 1 mL of methanol and a small sample was removed for analysis. NMR showed that there was no unreacted MMA present. GPC showed $\overline{M}_n$ 14,400 (theor. 5100), $\overline{M}_w$ 35,600, D=2.47. Precipitation with 1:1 methanol-water gave 4.95 g of PMMA.

EXAMPLE 22

The following example illustrates the use of a protected functionalized silylpolyenolate initiator to prepare PMMA with a terminal carboxylic acid group (after deprotection).

A. Preparation of 2-Methyl-1,1-bis(trimethylsiloxy)-1,3-butadiene

To a solution of 42 mL (0.3 mol) of diisopropylamine in 500 mL of tetrahydrofuran at 0° was added 0.3 mol of n-butyl lithium/hexane. After 30 min at 0°, the solution was cooled to −78°, and a solution of 14 g (0.14 mol) of tiglic acid in 50 mL of tetrahydrofuran was added. After 1 h at −78°, 38 mL (0.3 mol) of chlorotrimethylsilane was added at −78°. After slowly warming to room temperature, the solution was evaporated. The residue was treated with dry hexane, filtered, and the filtrate was evaporated; the residue was distilled in a small spinning band column to give 11.6 g of 2-methyl-1,1-bis(trimethylsiloxy)-1,3-butadiene, b.p. 37°/0.35-31°/0.25 Torr., density 0.86 . NMR (360 mHz in CDCl$_3$): 0.22 (2s, 18H, OSiMe), 1.62 (s, 3H, C=CMe), 4.71 (dd J=10 , J=2 Hz, 1H, C=CH), 4.77 (dd, J=18, J=2 Hz, 1H, C=CH), 6.66 (dd, J=18, J=10 Hz, 1H, C=CH).

B. Polymerization of MMA with 2-Methyl-1,1-bis(trimethylsiloxy)-1,3-butadiene and TAS Bifluoride To a solution of 0.8 g (0.93 mL, 3.3 mmol) of 2-methyl-1,1-bis(trimethylsiloxy)-1,3-butadiene and 10 μL of 1M TAS bifluoride/acetonitrile in 30 mL of tetrahydrofuran was added 10.8 mL (100 mmol) of MMA. A small exotherm was observed, so an additional 30 μL of 1M TAS bifluoride/acetonitrile was added, giving a slow temperature increase of 5° and a return to room temperature during a period of 1 h. A sample was removed for analysis. NMR showed no residual monomer. GPC showed $\overline{M}_n$ 3910, $\overline{M}_w$ 4570, D=1.17 (theor. 3200). The solution was treated with 2 mL of 10% hydrochloric acid in methanol, and after 30 min the polymer was precipitated with aqueous methanol to give 10.35 g of PMMA with a terminal carboxylic acid group. Anal. Acid Number Calcd for $\overline{M}_n$ 3910: 14.32 mg KOH/g. Found: 13.70, 14.38 mg KOH/g. NMR showed that the olefinic end group of the polymer resulted from 71% substitution at the 2-position of the initiator to give 2 diasteromers (multiplets at 5.1, 5.89, and 6.08 ppm) and 29% substitution at the 4-position of the initiator giving a conjugated acid (multiplets at 2.48, broad CH$_2$, and 6.72 ppm).

I claim:
1. Group Transfer Polymerization process comprising contacting under polymerizing conditions at least one acrylic monomer with (i) a tetracoordinate organosilicon, organotin or organogermanium polymerization initiator having at least one initiating site and (ii) a cocatalyst which is a source of bifluoride, fluoride, cyanide or azide ions or a suitable Lewis acid, Lewis base or selected (bi)oxyanion, the process further characterized in that:
   (i) the monomer comprises one or more polyenoate compounds of the formula CH(R$^2$)=C(R$^3$)[C(R$^4$)=C(R$^5$)]$_n$—C(O)X; or
   (ii) the initiator comprises one or more polyenolates of the formula Q$^2$[C(R$^3$)=C(R$^4$)]$_n$Q$^1$ or C-silylated keto isomers thereof; or
   (iii) the monomer comprises one or more polyenoate compounds of the formula CH(R$^2$)=C(R$^3$)[C(R$^4$)=C(R$^5$)]$_n$—C(O)X and the initiator comprises one or more polyenolates of the formula Q$^2$[C(R$^3$)=C(R$^4$)]$_n$Q$^1$ or C-silylated keto isomers thereof wherein:
   R$^2$ is:
   (a) —H or —C(O)X;
   (b) a hydrocarbyl radical which is an aliphatic, alicylic, aromatic or mixed aliphatic-aromatic radical containing up to 20 carbon atoms;
   (c) a polymeric hydrocarbyl radical containing at least 20 carbon atoms;
   (d) a radical of (b) or (c) containing one or more ether oxygen atoms within aliphatic segments thereof; or

(e) a radical of (b), (c) or (d) containing one or more functional substituents that are inert under polymerizing conditions;

each of $R^3$, $R^4$ and $R^5$, independently, is —H or a radical as defined in (b), (c), (d) and (e) for $R^2$;

X is —OR or —NR'R";

R is a radical as defined in (b), (c), (d) and (e) for $R^2$; or R and the closest $R^5$ taken together, form a 5- to 8-membered lactone ring;

each of R' and R", independently, is $C_{1-4}$ alkyl; and n is an integer and is at least 1; provided, however:
(i) when n is 1, at least one of $R^2$, $R^4$ and $R^5$ is hydrocarbyl;
(ii) the number of $R^{2-5}$ hydrocarbyl substituents does not exceed the number of —C=C— double bonds; and
(iii) a carbon atom substituted with $R^{2-5}$ hydrocarbyl is not adjacent to more than one other carbon atom substituted with $R^{2-5}$ hydrocarbyl, hydrocarbyl in (i), (ii) and (iii) being as defined above in (b), (d) and (e) for $R^2$;

$Q^1$ is —C($R^5$)=C(OM[$R^1$]$_3$)X';

$Q^2$ is —C($R^2$)=C(X')OM[$R^1$]$_3$ or —$R^2$;

X' is —OSi($R^1$)$_3$, —R, —OR or —NR'R";

each $R^1$, independently, is a hydrocarbyl radical which is an aliphatic, alicyclic, aromatic, or mixed aliphatic-aromatic radical containing up to 20 carbon atoms; and M is Si, Sn or Ge;

provided, however, in the initiator of the formula $Q^2[C(R^3)=C(R^4)]_nQ^1$ or C-silylated keto isomers thereof not more than one of $R^5$ and the closest $R^4$ is hydrocarbyl; and when $Q^2$ is —C($R^2$)=C(X')OM[$R^1$]$_3$, not more than one of $R^2$ and the adjacent $R^3$ is hydrocarbyl, to produce "living" polymer comprising:
(i) at least three repeat units of the formula —CH($R^2$)—[C($R^3$)=C($R^4$)]$_n$C($R^5$)(C(O)X)—; or
(ii) at least three repeat units of a Group Transfer Polymerization acrylic monomer; or
(iii) a mixture of at least three repeat units of (i) and (ii); each of (i), (ii) and (iii) containing
(a) —M($R^1$)$_3$ moieties at "living" ends of the polymer chains; and
(b) at non-living ends of the polymer chains, a saturated hydrocarbyl radical, or the unsaturated moiety $R^2[C(R^3)=C(R^4)]_nC(R^5)(C(O)X')$—, provided, however, only the unsaturated moiety when the "living" polymer contains only repeat units (ii), and provided further, however:
(i) when n is 1, at least one of $R^2$, $R^4$ and $R^5$ is hydrocarbyl;
(ii) the number of $R^{2-5}$ hydrocarbyl substituents does not exceed the number of —C=C— double bonds; and
(iii) a carbon atom substituted with $R^{2-5}$ hydrocarbyl is not adjacent to more than one other carbon atom sustituted with $R^{2-5}$ hydrocarbyl, hydrocarbyl and all other symbols being as defined above.

2. Process of claim 1 wherein $R^2$ or $R^5$ is hydrocarbyl.

3. Process of claim 1 wherein $R^5$ is hydrocarbyl.

4. Process of claim 1 wherein at least one of R, and $R^{2-5}$ is methyl.

5. Process of claim 1 wherein at least one of R, and $R^{2-5}$ is ethyl.

6. Process of claim 1 wherein X is —OR and n is 1–3.

7. Process of claim 1 where the monomer comprises one or more polyenoates, as defined in claim 1.

8. Process of claim 1 where the initiator comprises one or more polyenolates, as defined in claim 1.

9. Living polymer product of the process of claim 1.

10. "Living" polymer comprising:
(i) at least three repeat units of the formula —CH($R^2$)—[C($R^3$)=C($R^4$)]$_n$C($R^5$)(C(O)X)—; or
(ii) at least three repeat units of a Group Transfer Polymerization acrylic monomer; or
(iii) a mixture of at least three repeat units of (i) and (ii);

each of (i), (ii) and (iii) containing
(a) —M($R^1$)$_3$ moieties at "living" ends of the polymer chains; and
(b) at non-living ends of the polymer chains, a saturated hydrocarbyl radical, or the unsaturated moiety $R^2[C(R^3)=C(R^4)]_nC(R^5)(C(O)X')$—, provided, however, only the unsaturated moiety when the "living" polymer contains only repeat units (ii), wherein:

hydrocarbyl radical is as defined in (b)–(e) for $R^2$ below;

$R^2$ is:
(a) —H or —C(O)X;
(b) a hydrocarbyl radical which is an aliphatic, alicyclic, aromatic or mixed aliphatic-aromatic radical containing up to 20 carbon atoms;
(c) a polymeric hydrocarbyl radical containing at least 20 carbon atoms;
(d) a radical of (b) or (c) containing one or more ether oxygen atoms within aliphatic segments thereof; or
(e) a radical of (b), (c) or (d) containing one or more functional substituents that are inert under polymerizing conditions;

each of $R^3$, $R^4$ and $R^5$, independently, is —H or a radical as defined in (b), (c), (d) and (e) for $R^2$;

X is —OR or —NR'R";

each $R^1$, independently, is a hydrocarbyl radical which is an aliphatic, alicyclic, aromatic, or mixed aliphatic-aromatic radical containing up to 20 carbon atoms;

R is a radical as defined in (b), (c), (d) and (e) for $R^2$; or R and the closest $R^5$ taken together, form a 5- to 8-membered lactone ring;

each of R' and R", independently, is $C_{1-4}$ alkyl;

M is Si, Sn or Ge; and n is an integer and is at least 1; provided, however:
(i) when n is 1, at least one of $R^2$, $R^4$ and $R^5$ is hydrocarbyl;
(ii) the number of $R^{2-5}$ hydrocarbyl substituents does not exceed the number of —C=C— double bonds; and
(iii) a carbon atom substituted with $R^{2-5}$ hydrocarbyl is not adjacent to more than one other carbon atom substituted with $R^{2-5}$ hydrocarbyl, hydrocarbyl in (i), (ii) and (iii) being as defined above in (b), (d) and (e) for $R^2$.

11. "Living" polymer of claim 10 which includes central segments of the formula

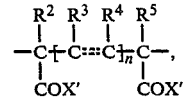

wherein $R^{2-5}$ and n are as defined in claim 10 and X' is $-OSi(R^1)_3$, $-R$, $-OR$ or $-NR'R''$ wherein R, $R^1$, R' and R'' are as defined in claim 10.

12. Polymer of claim 10 wherein M is Si.
13. Polymer of claim 11 wherein M is Si.
14. Polymer of claim 10 wherein $R^2$ or $R^5$ is hydrocarbyl.
15. Polymer of claim 11 wherein $R^2$ or $R^5$ is hydrocarbyl.
16. Polymer of claim 14 wherein $R^5$ is hydrocarbyl.
17. Polymer of claim 15 wherein $R^5$ is hydrocarbyl.
18. Polymer of claim 10 wherein at least one of $R^{2-5}$ is methyl or ethyl.
19. Polymer of claim 11 wherein at least one of $R^{2-5}$ is methyl or ethyl.
20. Polymer of claim 14 wherein X and X' are $-OR$ and n is 1 to 3.
21. Polymer of claim 15 wherein X and X' are $-OR$ and n is 1 to 3.
22. Polymer of claim 20 wherein R is methyl or ethyl.
23. Polymer of claim 21 wherein R is methyl or ethyl.

* * * * *